Patented Mar. 11, 1952

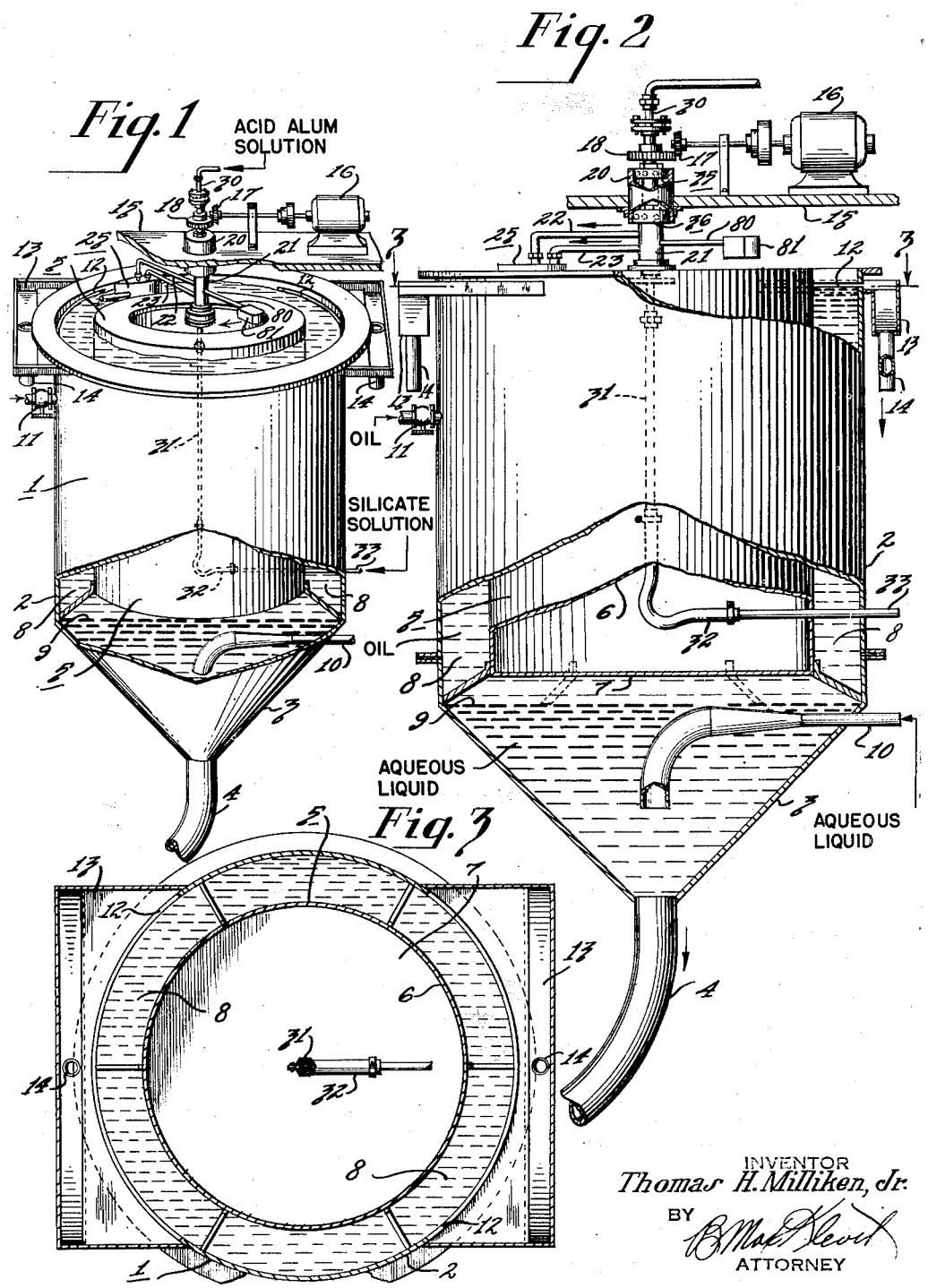

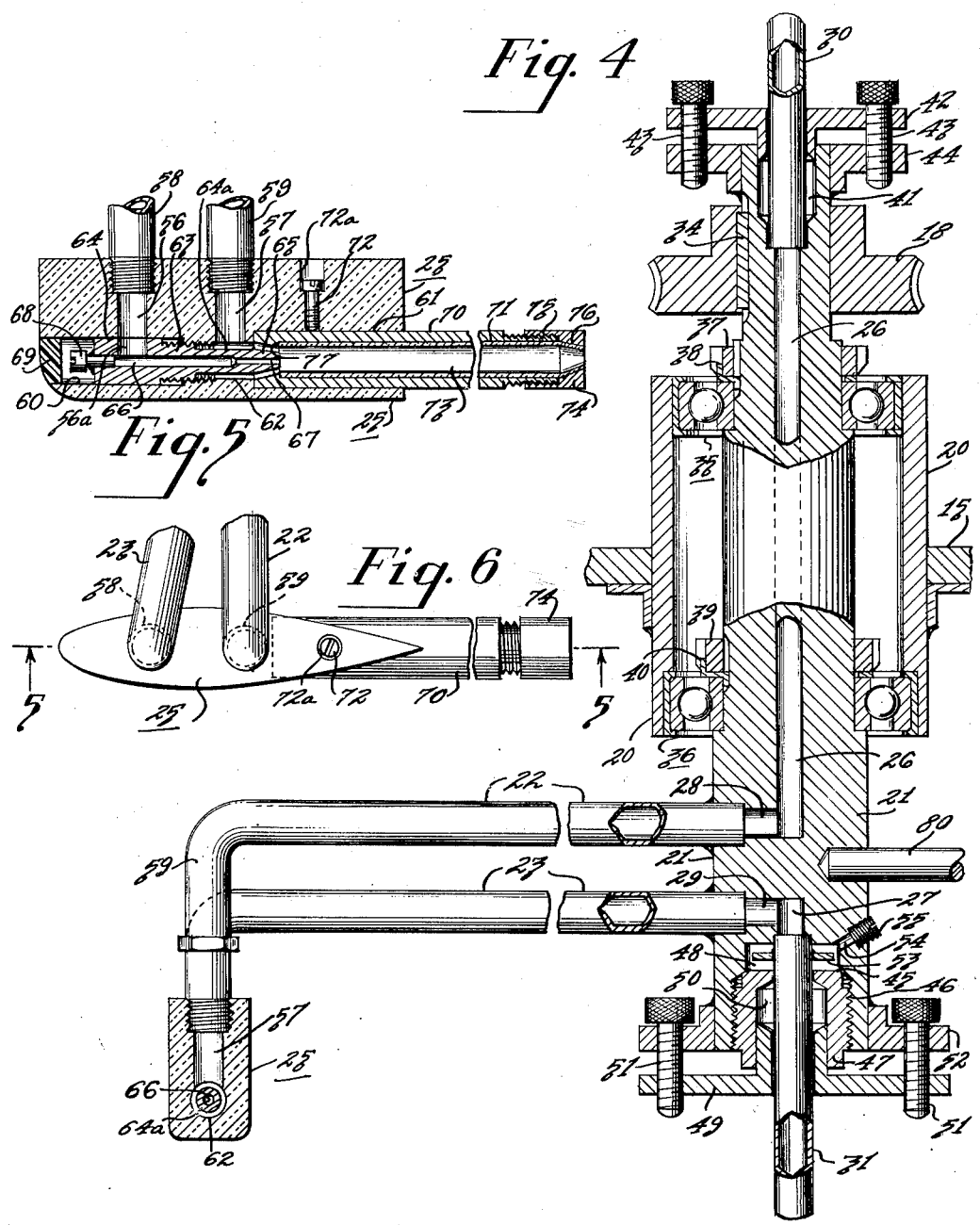

2,588,402

UNITED STATES PATENT OFFICE 2,588,402

PROCESS AND APPARATUS FOR PRODUCING HYDROGEL BEADS

Thomas H. Milliken, Jr., Chester, Pa., assignor to Houdry Process Corporation, Wilmington, Del., a corporation of Delaware Application August 2, 1948, Serial No. 41,983

17 Claims. (Cl. 252—448)

The present invention relates to an improved process and novel apparatus for forming adsorbent gel particles of spheroidal shape and is particularly directed to the production of inorganic oxide gels useful as catalysts or other contact masses.

It has hitherto been proposed to form spheroidal gel beads by introducing a gelable hydrosol into a body of water immiscible liquid, such as an oil, wherein globules of hydrosol set to firm hydrogel while in the oil bath. Such methods are now being commercially employed for the preparation of gel catalysts and adsorbents in bead form.

By the present invention the operation in forming of spheroidal gel particles is rendered more efficient, the rate of production is materially increased and the properties of the formed beads are considerably improved.

In accordance with the invention a stream of fast setting hydosol is discharged from a nozzle rapidly moving, preferably in a circular path, directly above a body of liquid immiscible with the hydrosol, the nozzle being positively actuated to travel at a rate equal to, or slightly less than, the stream of hydrosol leaving it, and in a direction opposite thereto, resulting in the emerging stream having at most a very low horizontal velocity relative to the body of immiscible liquid into which the stream is directed. The stream of hydrosol is laid down on the surface of the immiscible liquid which is preferably of lower specific gravity than the hydrosol, and the hydrosol, as a result of interfacial tension between it and the immiscible liquid, is formed into globules which set as spheroidal beads in the body of immiscible liquid.

In this manner the beads of gel can be produced with extreme rapidity as compared with prior known methods, and with little or no coalescence between the globules.

In the preferred practice of the invention, the solutions forming the hydrosol composition are mixed by jet action approximate the inlet of the discharge nozzle and the reaction mixture travels over a comparatively short distance to discharge, so that despite the rapidity of setting of the mixed hydrosol, gelation within the nozzle is avoided. This aspect of the invention finds particular beneficial use in the preparation of siliceous gels and notably plural oxide gels; interacting solutions of the gel-forming components being fed to the moving head to which the nozzle is attached and admixed to form a gelable hydrosol. One of the reactant solutions may comprise compounds furnishing one or more of the metal oxide components of the gel and the other reactant solution or solutions may comprise alone, or in addition to compounds furnishing in the reaction other desired metal oxide or oxides, accelerating or gelling agents, such as substances modifying or controlling the pH of the reacting solutions.

By the improved operation according to the invention very rapid setting hydrosols, such as those having setting time as low as 0.1 second and up to about 5 seconds can be formed into gel particles in the form of spheroidal beads. This permits the use of gel forming compositions of high product concentration which tend to produce firmer hydrogel beads, better capable of withstanding subsequent handling and treatment in the finishing operations and resulting in hardier dried beads with lesser quantities of broken fragments. Because of the rapid mixing of the reactant solutions adjacent the point of discharge, despite the rapidity of setting to hydrogel, the mixing chamber and discharge jet are maintained substantially free of gel deposit over long periods of continuous operation. Moreover, the comparatively low water content of the formed hydrogel affords considerable saving in drying equipment and permits the use of mild drying conditions to obtain drying in a reasonable time.

The size of the formed hydrogel globules and accordingly of the ultimate dried beads will be determined to a certain extent by the diameter of the stream issuing from the discharge nozzle and the velocity of the stream relative to the body of immiscible liquid. Other factors entering into the determination of the degree of sphericity as well as the size of the hydrogel beads formed in the process include: the viscosity and density of the body of immiscible liquid as well as the viscosity and density of the hydrosol; and the interfacial tension between the particular immiscible liquid and the hydrosol in any given system.

The hydrosol employed is preferably one which is capable of setting to an all embracing hydrogel, that is a solid colloid of the jelly type including all of the reactant solutions of the sol. However, the presence of small amounts of gelatinous precipitate in the formed gel is not excluded, provided that the major portion of composition of the sol is capable of setting to a true hydrogel embracing or otherwise including such minor amounts of precipitate.

The invention finds particular application in the preparation of siliceous plural oxide catalysts such as silica-alumina, silica-zirconia, silica-beryllia, silica magnesia and ternary combinations such as silica-alumina-zirconia, silica-alumina-beryllia and silica-alumina-magnesia. Such catalysts are of importance in catalytic conversion of hydrocarbons, as for instance, for the catalytic cracking of higher boiling hydrocarbons to gasoline, for the reforming of naphthas including virgin, thermally cracked, and catalytically cracked naphthas to improve grades of gasoline, for the polymerization of hydrocarbon gases, and for other uses. Small amounts of promoter materials such as metals or oxides thereof may be incorporated as promoters in the bead catalyst, such as those of magnesium, vanadium, manganese, chromium, tungsten, lithium, calcium, molybdenum and nickel; these promoters being preferably present in quantities of 1% or less.

The present device and operation may be employed with added advantages in connection with the incorporation of fine powder materials into the gel beads to improve the porosity and regeneration characteristics of the beads and to facilitate drying of the hydrogel with reduced breakage of the beads in drying. The powder will be initially uniformly distributed in the hydrosol, and because of the rapid setting of the hydrosol to form the hydrogel, the powder if of sufficient small size will be better fixed in distributed condition in the hydrogel, having less opportunity to settle and/or become localized therein. Moreover, the observed usual tendency of hydrosols to form flocs in the presence of incorporated dry powders can be eliminated or considerably reduced to non-interfering proportions by operating in accordance with the invention described.

The invention will be understood and other advantages of the novel apparatus and improved method appreciated from the description which follows, read in connection with the accompanying drawings which are illustrative, and wherein:

Figure 1 is a perspective view on a reduced scale, largely diagrammatic, illustrating the arrangement and operation of an apparatus adapted for the practice of the invention; Figure 2 is a front elevation of the apparatus, portions being broken away and shown in section; Figure 3 is a horizontal section taken on the line 3—3, Figure 2; Figure 4 is an enlarged detail view, partly in elevation and partly in section, of the drive mechanism and attached liquid supply lines to the jet mixer; Figure 5 is a vertical section on an enlarged scale through a portion of the apparatus comprising the carrying head for the jet mixer and discharging nozzle taken on line 5—5 of Fig. 6; and Figure 6 is a plan view of the same portion.

As will be seen particularly from Figures 1, 2 and 3, the apparatus comprises an outside liquid containing tank 1 provided with a vertical wall 2 forming its cylindrical upper section and downwardly converging wall 3 forming a funneled lower section, which communicates with a discharging sluice pipe 4.

Within the external tank 1 there is suitably supported an internal cylindrical tank 5, provided with vertical side wall 6 and bottom closure 7; and forming an annular chamber 8 between the walls 2 and 5 in the upper portion of the tank 1. In operation, the funneled lower portion of tank 1 is filled with liquid, such as water or other aqueous solution, up to approximately the level of the bottom 7 of the inside tank or to some extent above or below that level, and a water immiscible liquid such as an oil is supplied thereabove, as indicated by the liquid interface 9 between the two liquids. The exact level of the water in the tank is not important, provided there is sufficient oil in the annular chamber above the water level for the purposes hereinafter explained. A continuous supply of water or other aqueous solution into the lower part of the tank 1 is furnished by means of a supply line 10. By modifying the rate of liquid supply through line 10 with respect to the discharge rate through sluice pipe 4, the level of the interface 9 can be raised or lowered.

Water immiscible liquid, such as oil, is supplied in the annular chamber 8 by means of a valve-controlled supply line 11. The upper level of the water immiscible liquid in the tank is maintained by means of a slot 12 or other openings formed in the outside wall 2 near the top of the tank, said slots or other openings permitting the immiscible liquid to overflow into a pan 13 suitably mounted on the periphery of wall 2 and extending over a desired circumferential portion of such periphery. One or more of such pans communicating with openings in the wall may be provided; two being here shown. Each of the pans 13 communicates with a collecting pipe 14, which may be connected to a storage reservoir or to a suitable pumping system operatively connected to line 11 for recirculation of overflowed oil continuously or intermittently as desired.

A supporting structure generally indicated by 15 is mounted above the upper level of the tank 1, on which structure are mounted the operating and transmission mechanism, including a prime mover such as an electric motor designated at 16, and gearing 17 and 18 operating to rotate the drive assembly. A bearing housing 20 is affixed to the supporting structure 15 and thereby suspends the driven shaft and component parts above the center of tank 1.

The driven structure includes a rotating shaft 21 to which are attached liquid conducting lines 22 and 23 which lines are positively moved in a circular path by the rotation of such shaft. These conducting lines 22 and 23 communicate with and are attached to a streamlined boat-shaped member 25 comprising the mixing head, which member is thus moved in a circular path concentric with the annular space 8, the motion of the shaft 21 being transmitted through lines 22 and 23.

As shown particularly in Figure 4, the shaft 21 is formed with a central vertical upper bore 26 and a non-communicating central lower bore 27. Shaft 21 is also provided with a horizontal bore as shown at 28 intersecting and communicating with the bore 26 at its terminus within the shaft. The liquid conducting line 22 is inserted partly into the bore 28 and is fixedly attached to the shaft 21 by welding or other suitable means.

In like manner the bore 27 communicates at its upper terminus with a horizontal bore 29 in the shaft 21, through which bore the line 23 is inserted into the shaft and suitably affixed thereto. The vertical leg 30 of a liquid supply line communicates at the upper portion of the shaft 21 with the bore 26, whereby liquid supplied through the leg 30 runs through the bores 26 and 28 into the line 22. In similar manner, at the bottom of the shaft 21 a separate liquid supply line 31 is provided to communicate with the bores 27 and 29 and thereby with the liquid conducting line 23. As will be seen from Figure 1, the leg 30 is supplied with liquid by a line which may be connected to any suitable source of supply, and the line 31, by means of a flexible tubing 32, is connected to a supply line 33, also running to a supply source different from that supplying the leg 30.

The details of the shaft assembly are shown in Figure 4. Driven gear 18 is keyed to the shaft 21 as shown at 34. The shaft is supported for rotation within the housing 20 containing aligned anti-friction bearings 35 and 36 supporting the shaft in vertical alignment. The bearings are locked in position respectively by a lock nut 37 and lock washer 38 and by lock nut 39 and lock washer 40. Above the gear 18 and surrounding the leg 30, the end of the shaft 21 is counterbored to provide an enlarged space 41 for the insertion of a packing gland, which gland is retained in the end of the shaft by a flanged retaining member 42 vertically movable into the bored end of the shaft. Adjustment of the packing is provided by screws 43 threaded in member 42 and in the companion flanged member 44, the latter being fixedly attached to the shaft 21.

The lower end of the shaft 21 is counterbored as indicated at 45 and 46 to provide a stepped recess, and the bored portion 46 is internally screw threaded to receive a correspondingly threaded plug member 47 thereby providing a liquid sealing space 48 above the plug member for purposes to be hereinafter explained. The plug member 47 is also provided with a central bore closed at the bottom by a flanged retaining member 49 inserted partly thereinto and providing a space 50 for the insertion of a packing gland surrounding line 31. Adjustment for the packing gland is provided by screws 51 threaded through the flanged member 52 affixed to the shaft 21, and also threaded into the companion flanged member 49. The movement of retaining member 49 toward and away from the member 52 thereby provides an adjustment for the packing within the space 50.

A circular plate member 53 is fixedly mounted on the line 31 within the space 48, the diameter of the plate being smaller than that of the space. The space 48 is filled up to the level of the plate member 53 or somewhat thereabove with a liquid sealing means, such as mercury, which is supplied to said space through a communicating inlet 54 closed by a plug 55. When the shaft 21 is stationary the liquid sealing means will lie on the upper surface of plug 47 and partly fill the space 48 up to the liquid level provided. However, when the shaft 21 is being rotated, the liquid sealing means will be thrown outwardly against the periphery of space 48 filling the annular space between the periphery of the plate and the inner wall of the space 48, with portions of the liquid entering above plate 53 and thereby opposing admission of liquids or fine solids leaking from the bore 27 into the space 48 and thereby into the packing gland.

The mixing head 25, details of which are shown particularly in Figure 5, will now be more fully described. The streamlined body forming the head 25 is made of a corrosion-resistant material, such as Lucite or other plastic, and is provided with vertical bores 56 and 57 at the upper surface thereof, which bores pass only partly through the body, as shown. The bores 56 and 57 at the upper portion thereof are counterbored and screw threaded to receive respectively the downwardly directed legs 58 and 59 of liquid conducting lines 22 and 23.

The head 25 is also provided with a central horizontal bore at the lower portion thereof extending from the front to short of the center as indicated at 60, and with a horizontal bore extending from the rear to short of the center as indicated at 61; the two passages thus formed being connected by a communicating bore of reduced diameter in alignment therewith as indicated at 62. The vertical bore 56 thereby communicates with the horizontal bore 60 and the vertical bore 57 communicates with the horizontal bore 62. The portion of the bore 62 extending from the inner terminus of bore 60 to the side wall of bore 56 is screw threaded to receive a correspondingly threaded jet member 63 provided with an enlarged portion 64 forming a boss adapted to fit closely within the bore 60. This enlarged portion is provided with a recess 56a corresponding to and communicating with bore 56, which may be readily formed by boring through the boss 64 while the jet member 63 is in place in the head 25.

Beyond the screw threaded portion of the jet 63 and opposite the enlarged portion 64, the diameter of the jet member is further reduced as indicated at 64a, the jet member ultimately ending in a tapered portion 65 extending, when the nozzle is inserted within the head 25, beyond the intersection of vertical bore 56 with horizontal bore 62. The jet member 63 is centrally bored horizontally to provide a forward passage 66 and a rear passage 67, the latter being of smaller diameter than the former. The front of the passage 66 is closed by a plug member 68, access to which may be had through the front opening in the head 25 provided by the bore 60, which opening in normal operation may be closed by a removable closure member 69, the outside of which conforms in general to the contour of the front portion of the head 25.

Within the bore 61 in member 25 there is inserted a tightly fitting tubular nozzle member 70, centrally bored as indicated at 71 through the major part of its length, and provided at the front end thereof with a tapered bore paralleling the tapered portion 65 of the nozzle member 63. The tubular member 70 is held in place by a set screw 72 inserted through the bore 72a at the upper portion of the head 25. The tubular nozzle member 70 encloses a tube 73 formed of a yieldable plastic, such as "Tygon," extending beyond the rear extremity of the nozzle member 70 and held in place thereon by a compressing and retaining cap 74 screw threaded onto the member 70 as indicated at 75. The inner wall of the cap is slightly tapered at 76 to compress the end of the tube 73 and thereby reduce the size of the discharge opening of the tube. This taper may be approximately such as to reduce the diameter of the outlet orifice by about $\frac{1}{5}$ the internal diameter of the tube 73.

The internal taper at the forward end of the tubular member 70 is such that the same operates as a reducing adapter between the diameter of the bore 62 and the inside diameter of the tube 73, whereby providing an abutment at 77 within the member 70 against which the tube 73 is pressed by the cap 74.

To assure uniform rotation of the shaft 21 and to reduce the vibration in the system, the shaft may be provided with a counterweight attached thereto diametrically opposite the lines 22 and 23, which may take the form of an arm 80 (see Figure 2) suitably attached to the shaft 21 supporting a counterweight 81 at the outer extremity thereof.

The operation of the illustrated apparatus will now be described. For convenience of description, it will be assumed that a silica-alumina hydrogel is to be prepared from interacting solutions of an alkali metal silicate and an aluminum salt solution of suitable pH; it will be understood, however, that the invention is not limited to these particular compositions. The alkali metal silicate solution, which may be a commercial water glass (for instance "N-Brand") is admitted from any suitable proportionating or flow regulating means, through the supply line 33, flexible tubing 32 and line 31, entering into the bore 27, provided in the shaft 21, and communicating bore 29, thence through connecting line 23 and its vertical leg 58 into the bore 56 in the head 25. The solution then passes through recess 56a in jet member 63 and into the bored channel at 66 and 67, finally entering within the tube 73 in nozzle member 70. The acid aluminum salt solution, such as aluminum sulfate and dilute acid is admitted in regulated quantity, from a suitable source through the leg 39 and passes through the channel formed by bore 26 and connecting horizontal bore 28 in the shaft 21, into the connecting line 22 and its vertical leg 59, entering the annular space between the wall of bore 62 and jet member 63 and the annular space between the parallel tapered wall 65 and corresponding tapered wall of the nozzle member 70, into the tube 73 wherein it is admixed with the silicate solution and thoroughly agitated therewith as a result of the jet action and modified Venturi effect. The two solutions may be of selected concentration enabling the use of equal volumes, thereby simplifying flow control. The mixed hydrosol thereby formed in the mixing chamber provided in the tube 73 flows along the tube and is forcibly ejected as a result of the pressure of feeding of the solutions through the tapered portion 76 as a stream which falls upon the surface of the oil in the tank 1. The taper aids in delivering a more uniform stream and reduces turbulence.

The head 25 and attached nozzle member 70 are mounted for circular movement just above the upper level of the oil in tank 1; contact of the bottom of head 25 with the oil being preferably avoided so as to preclude agitation of the oil bath and permitting rapid travel of the head 25 unimpeded by the resistance that would otherwise be offered by the oil bath.

The stream of hydrosol when of higher specific gravity than the oil settles through the body of oil maintained in the annular chamber 8 between the tanks 1 and 5, and as a result of the interfacial tension between the oil and the hydrosol, the latter is broken up into globules which continue to settle in the body of oil. The hydrosol is advantageously of a selected composition that will set rapidly to hydrogel and the oil bath is of a sufficient depth that such setting takes place before the globules leave the oil bath. The set hydrogel globules continuing their settling in the oil pass through the interface between the oil and the aqueous solution, passing into the funnelled portion of tank 1. The aqueous solution admitted through the pipe 10 in the lower portion of tank 1, which may be water or salt solution having approximately the same osmotic pressure as the hydrogel, thereby also acts as the carrier medium for the hydrogel globules, carrying the same through the bottom of tank 1 and into the sluice pipe 4, which may be run to storage receptacles retaining the hydrogel for further processing, or may be connected directly to equipment for subsequent treatment of the hydrogel globules.

The speed of the rotation and thereby the linear velocity of movement of head 25 is controlled by suitable means (not shown) and is correlated with the flow rate of solutions into the nozzle 70, so that the rate of movement of the discharge outlet of the jet is approximately equal to the rate at which the hydrosol is discharged therefrom but opposite in direction thereto and the discharged stream accordingly has no horizontal velocity component or at least an immaterial one.

Because of the streamlined shape of the body comprising head 25, windage is materially reduced and very high speeds of rotation can be employed with correspondingly high rates of ejection of hydrosol from the nozzle resulting in increased production rates with equipment of comparatively small size.

It is advisable that the head 25 and the nozzle member 70 be maintained slightly above the surface of the oil in the tank below to avoid substantial agitation of the oil by the movement of the head. The upper portion of the oil, however, need not be maintained entirely quiescent, but it is preferred that at least the final setting of the hydrogel take place at a level in the oil bath that is fairly quiescent. If the stream of hydrosol is directed into an agitated body of oil and setting takes place under agitated conditions, some emulsification of the hydrosol may take place with consequent tendency to formation of globules of small size under conditions such that the size of the formed globules cannot be readily controlled.

The vertical distance between the discharge orifice at the end of the nozzle member 70 and the surface of the body of water-immiscible liquid is advantageously maintained as small as possible; for instance the distance from the radial center of the discharge orifice to the surface of the immiscible liquid may conveniently be approximately two to four times the internal diameter of the orifice or in general the horizontal tangent to the bottom of the orifice may be about ¼ to 1″ above the level of the immiscible liquid. As the distance of fall is increased, the force of impact of the hydrosol thereon due to increased momentum increases the spattering of the hydrosol with consequent formation of small particles of gel, which although less pronounced in the case of the more viscous hydrosols of high product concentration than in more dilute hydrosols, nevertheless must be taken into account. At these small vertical distances of fall the issuing hydrosol will generally be laid down on the surface of the oil as a practically continuous stream.

If desired, however, the vertical distance between the nozzle orifice and the surface of the oil may be increased even to the extent that the stream breaks in falling and thereby becomes discontinuous. When operating under these conditions the height of fall should then be so selected with respect to the setting time of the hydrosol that the stream of hydrosol breaks into segments forming globules during its descent, which globules set, before contacting the liquid surface below, at least sufficiently firmly not to be broken up into irregular sizes by spattering in falling upon the surface of this liquid. Operation under these conditions requires more precise control than the formation of globules within the oil as heretofore described.

While very rapidly setting hydrosols are desired for the manufacture of spheroidal gel particles by any of the methods of the present invention, it will be understood that in accordance with the preferred embodiment substantial setting does not take place above the oil bath, and that the shaping of the hydrosol and accordingly of the formed gel particles is effected by the interfacial tension between the liquid hydrosol and the oil.

For the incorporation of fine powders into the beads, the powder may be suspended in any of the separate solutions introduced into the mixing head or may be added through a separate inlet communicating with the mixing chamber. Because of the intensity of agitation provided by the jet mixer and with the use of hydrosols setting rapidly as in less than about 5 seconds, the tendency to form flocs is minimized. With the inclusion of powder the setting time is accelerated so that reduced product concentration of the principal reactants may be employed. For instance a composition of about 8 to 9 pH having a product concentration of 100 grams $SiO_2$ and $Al_2O_3$ per liter will set in about ¼ to ½ second at ordinary temperatures. With incorporation of sufficient quantity of powder in the composition, setting will take place under like conditions and in about the same time at a product concentration of the $SiO_2$ and $Al_2O_3$ in the reactant solutions equal to approximately 90 grams per liter. Likewise, a composition which would otherwise be employed at a product concentration of 120 grams per liter to set in the given time, would only require say about 110 grams per liter, if powder is incorporated. When silica-alumina ground gel or finely divided precipitate is employed as the incorporated powder, the total silica-alumina content, considering the added powder, is actually increased; in the latter example, for instance 110 grams of silica and alumina formed in the reaction in the presence of an additional 30 grams of powder, brings the total $SiO_2$-$Al_2O_3$ product concentration up to 140 grams per liter.

To obtain the full advantages for catalytic cracking, the powders should be of a size less than about 25 microns, preferably 5 to 15 microns, and should be present in at least 20% and probably 25 to 30% by weight of the $SiO_2$ and $Al_2O_3$ content of the reactants forming the hydrosol. The incorporated powder may be an inert material or one that is catalytically active, but must be substantially insoluble in the liquid components of the hydrosol and also insoluble in the oil bath or other immiscible liquid employed. Also, the powder must be one that is incombustible and infusible at the temperatures at which the catalyst is to be subjected. In general, materials infusible and incombustible at 1000° F. will be satisfactory. Since the hydrogel during drying shrinks considerably, it is also important that the incorporated powder be non-shrinking or at least shrink to a lesser extent than the gel in which it is included. Suitable materials for incorporation in powder form into the hydrogel include fused alumina, pumice, bauxite, clay, as well as dried or partially dried gels and gelatinous precipitates, which may be of the same or different composition than the hydrogel bead. Advantageously the powder employed should be one that is wet by water so as to adhere to the gel composition. Any of the powdered materials specified in my copending application Serial No. 529,594, filed April 19, 1944 (now U. S. Patent No. 2,287,065), may be employed and the methods of preparation of these fine powders specified in that application may be here utilized.

As heretofore indicated, in addition to appreciably reducing breakage on drying by the incorporation of sufficient powder of proper size range, the formed bead including the powder has a more open structure which is more readily penetrated, accounting for the improved regeneration characteristics of powder-containing catalyst beads. This difference in structure will be appreciated from the following comparisons: A sample of silica-alumina hydrogel beads to which no powder had been added was calcined at 1400° F. and its density was determined to be 0.98 kilogram per liter, the same composition and similarily prepared but with the inclusion of 25% silica-alumina powder of 10 micron size had after like calcination a density of only 0.77 kilogram per liter. In another instance, a bead sample which was hot aged for 4 hours in hydrogel state and had a density of .75 kilogram per liter was reduced in density to .57 kilogram per liter by inclusion of 30% powder.

The liquid in which the setting of the hydrosol to hydrogel takes place may be any liquid or combination of liquids substantially immiscible with water, and preferably liquids having a lower specific gravity than the hydrosol, such as, petroleum naphthas, kerosene, hydrocarbon oils; halogenated hydrocarbons such as carbon tetrachloride, perchlorethylene; alkylesters of carboxy acids such as dialkyl phthalates; for example dibutyl phthalate; etc., or physically combatible mixtures of the liquids recited giving desired density and viscosity. It is preferred to employ immiscible liquids of high viscosity compared with the hydrosol since these tend to give beads of more uniform shape and size.

Since the globules of hydrosol form in the immiscible liquid as a result of the interface which exists between the hydrosol and that liquid, these will have a form which is generally spheroidal comprising bounding surfaces corresponding to the interface. The dried gel beads ultimately obtained from the dried hydrogel globules will be of reduced size as a result of shrinkage in drying but will generally conform to the shape of the parent globules, and depending upon the various forces acting upon the unset globules in the formative stage, may depart from true spheres and take on more or less the shape of oblate spheroids, prolate spheroids or the like. An important factor governing the shape of the formed gel is the rate at which the globules of hydrosol travel through the water immiscible liquid, which in turn is dependent upon the relative density and viscosity of the medium employed. In a medium of a low viscosity and a density considerably less than that of the hydrosol, the globules will travel through the immiscible medium more rapidly and will then tend to assume a flatter or more disk-like shape. With a water immiscible medium having a density close to that of the hydrosol, a slower movement of the globules of hydrosol will result, with consequent formation of more spherical pellets.

An important aspect of the present invention, as hereinbefore indicated, involves the use of hydrosols having a very short setting time. The setting time of a hydrosol is dependent upon such factors as temperature, pH and concentration of the reactants; the setting time decreasing with increased temperature and increased concentration. With respect to pH, an optimum pH range for most rapid setting is found for hydrosols of particular compositions; which for instance, for silica-alumina hydrosols lies between about 5 to 9 pH, the setting time increasing with both higher or lower pH outside this range. Within this pH range, silica-alumina hydrosols setting in .2 to .5 second are readily obtained with product concentrations above about 80 grams of $SiO_2$ and $Al_2O_3$ per liter of mixed reacting solutions (not considering added powder). Compositions going up to above 125 grams per liter (excluding added powder) product concentration can be readily handled by methods of the invention.

The hydrogel globules formed in acccordance with the invention are ultimately dried with or without previous purification or other treatment, depending upon the composition thereof and the use to be made of the product. For use as catalyst in a hydrocarbon conversion operation, soluble impurities should ordinarily be removed from the hydrogel previous to drying. Thus, the wet hydrogel globules drained from the sluicing liquid may be washed with water and/or with aqueous solutions of acid or acidic salts such as ammonium chloride. In this manner alkali metal exchangeably held by the gel can be removed to provide a gel substantially free from alkali metal ions. With certain gel products, particularly those containing added powder, purification may be postponed until after drying.

To avoid breakage or weakening of the gel structure incident to rapid shrinkage during drying, the drying operation ordinarily must be carefully carried out. Hydrogel globules containing incorporated powder particles of proper size and in adequate amount can be subjected to more severe and more rapid drying conditions with considerably less breakage than hydrogels free of such powder, as disclosed in my aforesaid U. S. No. 2,487,065.

Careful drying of the hydrogel globules may be accomplished by prolonging the period of drying so that the rate of evaporation of water from the surface does not exceed the rate of diffusion of liquid from the interior to the surface. Such control of evaporation rate may be accomplished, for instance, by regulating the contributing factors including velocity of the gaseous medium contacting the hydrogel, and the temperature and the humidity maintained during the drying period. Efficient drying can be successfully accomplished by the use of currents of superheated steam or by the use of liquid baths forming azeotropic mixtures with water.

The dried gel particles may be calcined or heat treated in air, steam, inert gas or mixtures of these prior to use of the gel particles as catalysts or other contact masses.

The following examples illustrate typical operations in practice of the invention and should not be construed as limitations thereon.

Example I

Substantially equal volumes of "N-Brand" sodium silicate solution (28.7% $SiO_2$, 8.9% $Na_2O$) of 1.201 specific gravity and of an aqueous solution of 1.071 specific gravity containing aluminum sulfate and sulfuric acid ($SO_4/Na=0.78$) were admixed in a head of the type illustrated and ejected onto an oil bath through a nozzle having an orifice of 0.2 inch (5 mm.) diameter. The reactants were present in concentration and proportions giving a weight ratio in the solution of 93 parts $SiO_2$ and 7 parts $Al_2O_3$ and a product concentration of $SiO_2+Al_2O_3$ in the mixed solution of 110 grams per liter, to produce a gel of 8.3 pH.

The jet mixer was mounted so that the nozzle was parallel with the surface of the oil and the center line of the nozzle was between ⅝ and ¾ inches from the oil surface. The oil employed was a light machine oil having a specific gravity of 0.885 and a viscosity of 62 centipoises at 20° C., the depth of the bath being maintained at approximately two feet. The shaft was rotated at a velocity of 156 revolutions per minute so that the nozzle orifice was rotating at a rate of speed of about 23.2 feet per second and the solutions were fed thereto at approximately the same rate. Below the oil bath an aqueous solution of 5% sodium sulfate, augmented with air was circulated to remove the formed hydrogel beads. The setting time for the hydrogel was about ¼ to ½ seconds.

The formed beads were permitted to remain in sodium sulfate solution of 1.04 specific gravity at 130° F. for 8 hours and then subjected to purification. The purifying treatment involved base exchange with 10% aqueous aluminum sulfate solution (1.10 specific gravity) with 6 changes of solutions over 24 hours, followed by water washing until the product was $SO_4$ free.

The purified product was charged to a drying oven and dried at 155° dry bulb, 140° F. wet bulb. The beads obtained had a satisfactory hardness, were fairly free from undersized beads and ill-formed particles.

It was found as a result of base exchange that the alumina content of the beads was raised to 9.4%. The analysis of the dried bead being as follows:

Moisture 105° C., as received basis per cent__ 26.2

| | Parts by weight (dry basis) |
|---|---|
| Ignition loss, 1400° F.—2 hrs. | 8.61 |
| $SiO_2$ | 82.9 |
| $Al_2O_3$ | 8.45 |
| $Fe_2O_3$ | 0.06 |
| $Na_2O$ | 0.10 |
| $SO_4$ | 0.08 |
| CuO | 0.002 |
| NiO | 0.001 |

The beads formed were generally spheroidal with a minor diameter equal to about 75–80% of the major diameter.

The size distribution of the dried beads was such that over 60% were between about 3–4.4 mm., less than 6% being below 2.2 mm. and about 5% being above 5 mm.

The dried beads were subjected to heat treatment for 5 hours at 1350° F. in the presence of 10% steam, and then employed in cracking of a light East Texas gas oil under conditions of the "Cat-A" method (as described in "Laboratory Method for Determining the Activity of Cracking Catalysts," by J. Alexander and H. G. Shimp, page R537, National Petroleum News, Technical Edition, August 2, 1944). There was produced, based on charge, 40.7% by volume of gasoline with 2.4% by weight of coke and 7.2% by weight of dry gaseous products of 1.65 specific gravity.

Example II

Similar solutions were prepared and admixed as in the preceding example and in amounts to give a product concentration of 100 g./l. and a gel of 8.5 pH. In this case the mixed solutions forming the hydrosol were ejected into an oil bath composed of the light machine oil of the previous example and perchlorethylene, the oil mixture having a specific gravity of 0.97 and a viscosity of 18 centipoises at 20° C. The mixing head was rotated at 150 revolutions per minute giving a linear velocity for the movement of the nozzle at its orifice equal to 22.3 feet per second. The nozzle was maintained with the center line ½" from the oil surface. The formed beads were permitted to remain at room temperature in 5% sodium sulfate solution for 2 hours, one portion then being removed and the remainder being aged further in various batches in heated sodium sulfate solution for different times up to 16 hours. These gels were purified by treatment with aluminum sulfate solutions and water washed as in the previous example.

Portions of each of the several purified products were slowly dried in an oven at 155° F. dry bulb, 140° F. wet bulb for 8 hours followed by one hour in atmospheric air at 240° F. Other portions of each of the several purified products were dried for 4 hours at 240° F. in atmospheric air.

The major part of the formed beads which were slow dried were of desired regular shape and were substantially free from ill-formed and very fine particles. Over 68% of this product was between about 3 and 4.4 mm. size with less than 23% above 4.4 mm. size. The rapidly dried beads contained a considerable quantity of broken fragments.

*Example III*

Substantially equal volumes of N-Brand silicate, specific gravity 1.214 (containing 10 μ powder in an amount to give 25 parts powder per liter of solutions and aluminum sulfate solution with sulfuric acid, specific gravity 1.066, (giving a gel of pH 8–8.5) were admixed in the jet spray head and discharged to the oil bath comprised of light machine oil-perchlorethylene, specific gravity 0.976 and viscosity of 12 centipoises, at 28° C. The nozzle was rotated at 150 R. P. M. giving a linear velocity at the orifice of 22.3 feet per second. The nozzle of 5 mm. diameter, was at its center line about 0.5 inch above the oil bath.

(a) The beads set in the oil bath and were removed from the system, and aged for 1 to 2 hours at room temperature in 5% Na₂SO₄ solution. One portion of this material was further aged at 130° F. for 4 hours in 5% Na₂SO₄ solution. This portion was then water washed five times for 1 hour each time with water and then alkali metals removed by base exchange with 5% aluminum sulfate solution (6 changes of solution in 24 hours) of 1.05 specific gravity and again water washed relatively sulfate free. This washed material was charged to a drying oven and dried at conditions of 155° F. dry bulb and 140° F. wet bulb in a flowing atmosphere, and then heated for one hour at 240° F. in dry air.

The dried beads were then subjected to activity adjustment heat treating conditions for about 4½ (4.35) hours at 1400° F. in a flowing atmosphere of 6½% steam and 93½% air. The heat treated pellets had a bulk density of 0.74.

(b) Another batch of beads was similarly prepared except that these were aged in the heated sodium sulfate solution for 8 hours. After similar drying the beads were heat treated at 1400° F. for 10 hours in 95% air–5% steam. These heat treated beads, which had a bulk density of .675, were employed in cracking of the same light gas oil and under the same conditions as in Example I, yielding 46.8% gasoline by volume of charge, 3.4% by weight coke and 10.3% by weight of dry gas of 1.68 specific gravity.

The beads of this example showed regeneration characteristics substantially equal to that of commercial clay catalyst as determined by carbon burning studies, whereas beads prepared without powder have a lower burning rate, approximately 0.7 that of clay catalyst.

The degree of attrition of the powder included beads of this example as well as the crushing strength (over 27 pounds) were found to be satisfactory and compared favorably with commercial and typical beads free from powder.

In the preparation of a single oxide gel, there may be fed to the mixing chamber a solution of the salt of the metal whose oxide is required and a precipitant therefor. For instance, to prepare a silica gel, a solution of alkali metal silicate is fed through one of the liquid conducting lines communicating with the mixing chamber while a solution of mineral acid is supplied through the other line.

Obviously many modifications and variations of the invention as hereinbefore set forth may be made without departing from the spirit and scope thereof and, therefore, only such limitations should be imposed as are indicated in the appended claims.

I claim as my invention:

1. The process for the production of hydrogel particles having curved bounding surfaces which comprises horizontally ejecting from a moving orifice a narrow stream of hydrosol capable of setting to hydrogel and laying the ejected stream on the surface of a body of water-immiscible liquid of substantial depth, said surface being below the level of ejection, moving the point of ejection in a horizontal plane and in a direction opposite to the direction of ejection, maintaining the linear rate of ejection substantially equal to the linear rate of movement of the point of ejection, whereby as a result of interfacial tension said stream of hydrosol so laid down on the surface of said water-immiscible liquid is divided into globules which set as hydrogel in said body of water-immiscible liquid.

2. The process of producing hydrogel particles having curved bounding surfaces which comprises horizontally ejecting from an orifice at a controlled rate above a body of water-immiscible liquid of substantial depth a narrow stream of liquid capable of setting to hydrogel and while said orifice is positively moved at a controlled rate horizontally in a circular path, maintaining the direction of movement of said orifice opposite to the direction of ejection and maintaining the linear rate of movement of the orifice substantially equal to the linear rate of ejection whereby only a substantially vertical gravitational force acts on said ejected stream to lay said stream down on the surface of said body of water-immiscible liquid, settling the ejected liquid in the body of water-immiscible liquid whereby as a result of interfacial tension said ejected liquid is divided into segments having curved bounding surfaces which set to hydrogel during settling.

3. The method of preparing gel contact masses in substantially spherical form which comprises continuously introducing under pressure a liquid solution of reactant into a mixing zone, jetting into said mixing zone a liquid stream comprising a second reactant capable of interaction with the first named solution to form therewith a hydrosol capable of rapidly setting to hydrogel, whereby thorough agitation of the reactants is effected in said mixing zone, horizontally ejecting through an outlet the resulting reaction mixture from said mixing zone as a substantially cylindrical liquid stream by the force and at a rate controlled by the pressures of feeding the reactants into said mixing zone, moving said outlet together with said mixing zone in a horizontal plane in a direction maintained opposite to the direction of ejection, the linear rate of movement of said outlet being controlled in correlation with the linear rate of ejection so that the resulting force acting on the ejected liquid stream is substantially only gravitational, depositing said liquid stream as ejected on the surface of a body of water-immiscible liquid having a specific gravity lower than that of said stream, whereby the stream settles in and through the body of water-immiscible liquid and as a result of interfacial tension is divided into segments having curved bounding surfaces, said segments setting to hydrogel while settling in said body of immiscible liquid.

4. The method in accordance with claim 3 including the feature of introducing into said mixing zone finely divided particles of solid material insoluble in the reaction mixture and in the water-immiscible liquid, whereby the introduced particles are suspended in the ejected stream comprising the reaction mixture and are incorporated in the set hydrogel.

5. The method of preparing siliceous plural oxide hydrogel in the form of substantially spheroidal particles which comprises continuously introducing at a predetermined rate a stream comprising an aqueous solution of alkali metal silicate into a mixing zone, simultaneously introducing into said mixture zone at a predetermined rate a second stream comprising an aqueous solution of salt of a metal whose oxide is catalytically active in association with silica, intimately admixing and agitating said streams within said mixing zone whereby reaction takes place between said streams to form a hydrosol capable of setting to hydrogel, horizontally ejecting said hydrosol as a substantially continuous stream from said mixing zone by the continuous introduction of said streams of solutions, the rate of ejecting of said hydrosol stream being thus controlled by the rate of introduction of said streams of solutions, moving the point of ejecting said hydrosol along a horizontal path and approximately opposite to the direction of ejecting, controlling the rate of movement of the point of ejecting so that the linear rate of its movement is approximately equal to the linear rate at which said hydrosol stream is ejected, whereby said ejected stream falls approximately in a vertical direction, receiving said falling stream directly on the surface of a body of water-immiscible liquid of substantial depth, said liquid being of lower specific gravity than said hydrosol, said hydrosol stream in settling through said body of water-immiscible liquid being divided into globular segments in which form the hydrosol is set to hydrogel while settling in said immiscible liquid.

6. The method in accordance with claim 5 wherein one of said streams of solutions contains suspended therein finely divided particles of a solid material insoluble therein and insoluble in said water-immiscible liquid, said solid material being infusible and incombustible at 1000° F., whereby the finely divided particles are admixed in the formed hydrosol and thus incorporated in the set hydrogel.

7. The method in accordance with claim 6 wherein said second stream introduced into the mixing zone comprises an aluminum salt in solution.

8. The method in accordance with claim 5 wherein said second stream introduced into the mixing zone comprises an aluminum salt in solution.

9. The method of producing spheroidal hydrogel particles which comprises introducing under pressure into a mixing zone reactant solutions forming a hydrosol capable of rapid setting to hydrogel, intensively agitating and mixing said solutions to form a hydrosol in said zone, rapidly revolving said mixing zone about an external axis while continuously discharging formed hydrosol from said zone as a horizontal stream of fixed diameter at the point of discharge, dropping said discharged stream through a short distance onto a body of water-immiscible liquid therebelow maintained at a substantially fixed level so that the discharged stream of hydrosol falls through a distance not substantially greater than two to three times its diameter at the point of discharge, said body of water-immiscible liquid being lighter in gravity than said hydrosol and being of sufficient depth to permit setting of the hydrosol to hydrogel while settling therein, said stream of hydrosol in so settling being divided into segments as a result of interfacial tension, which segments set as spheroidal pieces of hydrogel while in said body of immiscible liquid.

10. Apparatus for forming hydrogel particles which comprises a stationary tank adapted to contain a body of liquid therein at a fixed level, a vertical driven rotating shaft mounted above said fixed liquid level and substantially equidistant horizontally from the peripheral boundary of said tank, liquid conducting pipes projecting horizontally from said shaft and attached thereto for movement therewith, liquid supplying means operatively communicating with said liquid conducting pipes, a mixing head communicating with said liquid conducting pipes and attached to said pipes for positive movement therewith in a circular path above said fixed liquid level, said positive movement being effected by the rotational movement of the shaft transmitted by the pipes, an enclosed mixing chamber formed in said mixing head, separate liquid conducting channels formed in said mixing head communicatively connecting said liquid conducting pipes with said mixing chamber through which channels liquids may be passed from said pipes to said mixing chamber, a horizontally disposed tubular nozzle communicating with said mixing chamber, said nozzle being attached to said mixing head for movement therewith, the projected horizontal length of said liquid conducting pipes being such that the mixing head attached thereto is within the horizontal periphery of said tank, said tubular nozzle having a discharge outlet from which liquids emerging from said mixing chamber and conducted through said nozzle are discharged into said tank.

11. Apparatus according to claim 10 wherein said liquid conducting channels formed in said mixing head comprise a horizontal channel concentric with the mixing chamber and aligned centrally thereof, and an annular channel extending along at least a portion of the length of said centrally aligned channel and surrounding the latter, both of said channels being arranged to discharge liquids into said mixing chamber.

12. Apparatus according to claim 11 wherein said centrally arranged channel and said annular channel are arranged to discharge liquids directly into said nozzle and said mixing chamber is thereby formed within said nozzle.

13. Apparatus according to claim 10 wherein each of said liquid conducting pipes comprises a downwardly directed vertical leg at the outlet of each pipe, said legs being attached to said mixing head through the upper surface of said head.

14. Apparatus according to claim 10 wherein said liquid supplying means comprises an upper upright tubular member passing through the vertical axis of the shaft at the upper end of said shaft and a lower upright tubular member passing through the vertical axis of said shaft at the lower end thereof, said shaft being formed with an upper longitudinal channel and with a lower longitudinal channel, said channels separately communicating respectively with each of said upright tubular members, said shaft further having upper and lower horizontal channels respectively connecting said vertical channels with said liquid conducting pipes attached to said shaft, whereby liquids may be conducted from said supplying means to said pipes by means of said channels.

15. Apparatus according to claim 14 wherein said upper and lower upright tubular members are fixed against rotation and thereby constitute axles about which said shaft is rotated.

16. Apparatus according to claim 14 wherein said shaft is formed with an internal cylindrical recess concentric with and surrounding an upright tubular member thereby forming an annular liquid sealing chamber between the outer wall of said tubular member and the inner wall of said recess, a horizontally disposed disk fixed to the periphery of said tubular member partitioning said chamber into upper and lower areas, the outer periphery of said disk being spaced from the internal wall of said recess whereby said upper and lower areas remain in communication, and liquid means in said chamber insufficient to completely fill the same, whereby rotation of said shaft causes said liquid means to be thrown outwardly by centrifugal action against the inner wall of said recess and to fill the upper area of said chamber as a liquid seal.

17. Apparatus for the production of hydrogel beads comprising a setting tank, a mixing head arranged for rapid movement about an external axis in a circular path approximate the top of said tank, said head being provided with a plurality of inlet ports and a horizontally directed discharge nozzle having a discharge orifice arranged to discharge a liquid stream in a direction opposite to the direction of movement of said head and directly falling into said tank, means for introducing reactant solutions into said ports at controllable rates, an enclosed mixing chamber formed within said head intermediate said ports and said discharge orifice, and means for moving said head at a controllable linear rate, whereby the circumferential rate of movement of said head can be correlated with the rate of introducing said reactant solutions.

THOMAS H. MILLIKEN, Jr.

REFERENCES CITED

The following references are of record in the file of this patent:

UNITED STATES PATENTS

| Number | Name | Date |
|---|---|---|
| 2,370,200 | Shabaker | Feb. 27, 1945 |
| 2,384,945 | Marisic | Sept. 18, 1945 |
| 2,408,986 | Marisic et al. | Oct. 8, 1946 |
| 2,417,664 | Schmitt | Mar. 18, 1947 |
| 2,428,895 | Shoeld | Oct. 14, 1947 |
| 2,435,379 | Archibald | Feb. 3, 1948 |
| 2,446,783 | Payne | Aug. 10, 1948 |
| 2,489,176 | Fash | Nov. 22, 1949 |
| 2,496,396 | Kassel | Feb. 7, 1950 |
| 2,533,278 | Milliken et al. | Dec. 12, 1950 |